(12) United States Patent
Pullini et al.

(10) Patent No.: US 11,351,611 B2
(45) Date of Patent: Jun. 7, 2022

(54) METHOD FOR APPLYING A REINFORCEMENT OF METAL MATERIAL TO A COMPONENT OF METAL MATERIAL, PARTICULARLY IN THE CONSTRUCTION OF A MOTOR-VEHICLE BODY OR A SUB-ASSEMBLY THEREOF

(71) Applicant: C.R.F. Società Consortile per Azioni, Orbassano (IT)

(72) Inventors: Daniele Pullini, Orbassano (IT); Massimo Cucco, Orbassano (IT); Gabriele Ciaccio, Orbassano (IT); Fabio D'Aiuto, Orbassano (IT); Michele Maria Tedesco, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 636 days.

(21) Appl. No.: 16/220,588

(22) Filed: Dec. 14, 2018

(65) Prior Publication Data
US 2019/0184462 A1 Jun. 20, 2019

(30) Foreign Application Priority Data

Dec. 20, 2017 (EP) ..................................... 17208803

(51) Int. Cl.
*B22F 10/20* (2021.01)
*B62D 27/02* (2006.01)
(Continued)

(52) U.S. Cl.
CPC ............ *B22F 10/20* (2021.01); *B22F 3/1115* (2013.01); *B23K 11/11* (2013.01); *B23K 26/34* (2013.01);
(Continued)

(58) Field of Classification Search
CPC ... B23K 11/11; B23K 11/0013; B23K 11/115; B23K 11/20; B23K 11/34; B23K 11/06;
(Continued)

(56) References Cited

U.S. PATENT DOCUMENTS

| 1,542,663 A | 6/1925 | Brenzinger |
| 6,037,559 A * | 3/2000 | Okabe .................. B23K 11/115 |
| | | 219/91.23 |

(Continued)

FOREIGN PATENT DOCUMENTS

| CN | 103072635 A | 5/2013 |
| EP | 2907603 A2 | 8/2015 |
| EP | 2907603 A3 | 4/2016 |
| JP | S58188582 A | 11/1983 |
| JP | 2015110233 A | 6/2015 |
| WO | 2015181772 A1 | 12/2015 |

OTHER PUBLICATIONS

European Search Report dated Jun. 14, 2018 (5 pages).
(Continued)

*Primary Examiner* — Ibrahime A Abraham
*Assistant Examiner* — Chris Q Liu
(74) *Attorney, Agent, or Firm* — RMCK Law Group PLC

(57) ABSTRACT

A structural joint between two components of metal material is obtained by carrying out an electrical resistance welding spot between said components and subsequently performing a step of applying a cladding of metal material by an additive manufacturing technology. In one example, after a first step of applying a coarse base cladding, a second step of applying a fine cladding is carried out, again by additive manufacturing technology. The fine cladding can include a distribution of stiffening micro-ribs above the base cladding. The same method can also be applied to a single sheet metal component, rather than to a welded joint.

6 Claims, 5 Drawing Sheets

Figure 1:
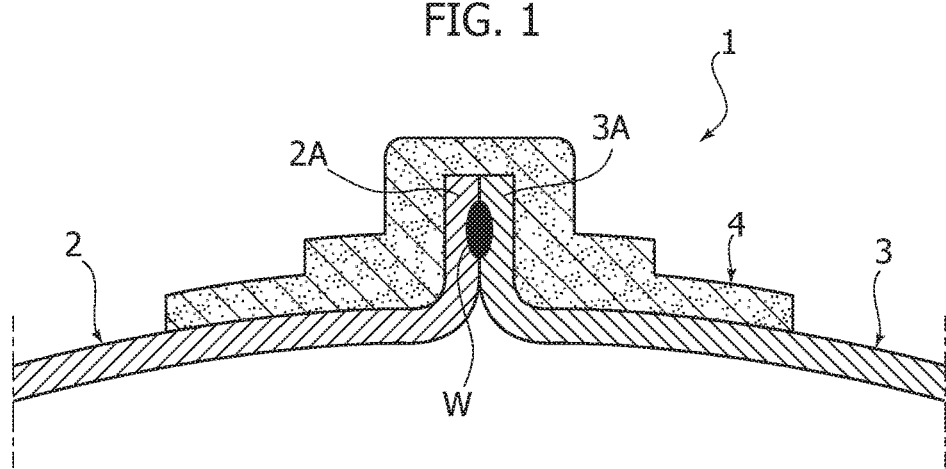

(51) Int. Cl.
- *B23K 26/34* (2014.01)
- *B22F 3/11* (2006.01)
- *B23K 11/11* (2006.01)
- *B23K 26/342* (2014.01)
- *B33Y 80/00* (2015.01)
- *B23K 101/02* (2006.01)
- *B33Y 10/00* (2015.01)
- *B33Y 30/00* (2015.01)
- *B23K 101/00* (2006.01)

(52) U.S. Cl.
CPC .......... *B23K 26/342* (2015.10); *B62D 27/023* (2013.01); *B23K 2101/006* (2018.08); *B23K 2101/02* (2018.08); *B33Y 10/00* (2014.12); *B33Y 30/00* (2014.12); *B33Y 80/00* (2014.12)

(58) Field of Classification Search
CPC . B23K 11/065; B23K 11/067; B23K 11/0876; B33Y 10/00; B33Y 80/00
USPC ........... 219/117.1, 118, 119, 121.63, 121.64, 219/121.84, 76.17, 78.02, 86.22, 91.2, 219/91.23
See application file for complete search history.

(56) References Cited

U.S. PATENT DOCUMENTS

| | | | | |
|---|---|---|---|---|
| 6,060,686 | A | * | 5/2000 | Jones ................. B23K 26/1224 219/121.63 |
| 6,814,823 | B1 | * | 11/2004 | White .................. B23K 20/103 156/73.1 |
| 2005/0150871 | A1 | * | 7/2005 | Offer ...................... B23K 20/10 219/76.17 |
| 2008/0178467 | A1 | * | 7/2008 | Hayashi ................. B62D 25/06 29/897.2 |
| 2013/0101423 | A1 | * | 4/2013 | Roy ...................... F04D 29/324 416/223 R |

OTHER PUBLICATIONS

"Development and Application of Laser Additive Manufacturing for Metal Component", Aeronautical Manufacturing Technology, Chinese Academic Journal Electronic Publishing House, 2012, http://www.cnki.net, 9 Pages.

Chinese Office Action dated Apr. 22, 2021. 8 pages.

* cited by examiner

METHOD FOR APPLYING A REINFORCEMENT OF METAL MATERIAL TO A COMPONENT OF METAL MATERIAL, PARTICULARLY IN THE CONSTRUCTION OF A MOTOR-VEHICLE BODY OR A SUB-ASSEMBLY THEREOF

CROSS-REFERENCE TO RELATED APPLICATION

This application claims priority to European Patent Application No. 17 208 803.1 filed Dec. 20, 2017. The disclosure of the above application is incorporated herein by reference in its entirety.

FIELD OF THE INVENTION

The present invention relates to methods for applying a reinforcement of metal material to one or more components of metal material, particularly in the construction of a motor-vehicle body or a sub-assembly thereof.

PRIOR ART

Applying a reinforcement of metal material above one or more components of metal material by means of "additive manufacturing" technology has already been proposed. This technology has been known and used for some time. It makes use of an energy source, such as a laser beam, to melt layers of metal powders in such a way as to form a metal part with a desired configuration, layer by layer. A machine for producing metal components by means of "additive manufacturing" technology is, for example, described and illustrated in the document WO 2015 181772A1.

Object of the Invention

The main object of the present invention is to identify new methods for applying metal reinforcements to one or more metal components, through the use of "additive manufacturing" technology, particularly in the manufacture of motor-vehicle bodies or sub-assemblies thereof.

In particular, one object of the invention is to identify new methods of producing metal structures, in particular motor-vehicle structures and sub-assemblies thereof, which allow significant improvements both in terms of lightness and in terms of strength of the obtained structure.

Another object of the invention is to achieve the aforesaid objectives with a method that is easily adaptable in current production lines of motor-vehicles and that, consequently, does not entail high costs for the implementation thereof.

Another object of the invention is that of optimizing, in particular, the manufacture of a motor-vehicle "body-in-white" (BIW), allowing the body to be framed by applying a limited number of electrical resistance welding spots.

Yet another object of the invention is to provide alternative manufacturing techniques for producing molded metal sheet components, in particular motor-vehicle components.

SUMMARY OF THE INVENTION

In the present description and in the claims that follow, the term "additive manufacturing" is used to mean a method in which an energy source is used, such as a laser or plasma beam, to selectively melt layers of metal powders, or metal wires, of various sizes, so as to form layer above layer of a metal "cladding" above a component. The cladding of the invention can also be multi-level and include both a coarse base cladding (thickness in the order of millimeters) as well as a fine cladding (thickness in the order of 100 microns) and/or a super-fine cladding (thickness in the order of tenths of micron or even less).

According to a first aspect, the present invention refers to a method for providing a structural joint between two components of metal material, in particular in the assembly of a motor-vehicle body or a subassembly thereof, wherein the method comprises the step of performing an electrical resistance welding spot between said components, and is further characterized in that it comprises the additional step of applying a "cladding" of metal material above said electrical resistance welding spot, by means of additive manufacturing technology.

According to this first aspect, the invention is preferably further characterized in that the aforesaid cladding application step by means of additive manufacturing technology comprises a first step for applying a coarse base cladding and a second step for applying a fine cladding, including the distribution of stiffening micro-ribs, above the base cladding.

Still preferably, these micro-ribs are formed according to an irregular honeycomb pattern, with relatively thin walls, which may have a cross-section with uniform or variable shape and dimensions along the height of the wall.

The Applicant's studies and experiments have shown that application of the above-described method to motor-vehicle body components consisting of galvanized steel sheet metal can result in local destruction of the outer layer of zinc due to the heat generated during the additive manufacturing method. To overcome this drawback, according to a preferred embodiment of the invention, the method is further characterized in that the step of applying cladding by additive manufacturing comprises an additional step for local application of a zinc overlay, also using additive manufacturing technology.

Another possible disadvantage deriving from application of the heat used during the additive manufacturing method could consist of a decrease in the strength characteristics of the metal sheet forming the component, due to the alteration of the microcrystalline structure obtained for example through a previous quenching process. In order to overcome this possible drawback, the method according to the invention is preferably characterized in that it also comprises a local quenching step obtained by feeding a cold fluid over the cladding, immediately after the cladding application step.

Thanks to all the aforesaid characteristics, the method according to the invention allows structural joints to be obtained between components of metal material having high strength characteristics, without detriment to the lightness of the structure. The term "structural joint" refers, precisely, to a joint that not only fulfills the task of keeping the two components of the joint rigidly connected to each other, but can also constitute—in itself—a part of the assembled structure, which is also assigned a "structural" function, i.e. that can significantly contribute to the ability of the entire structure ti sustain all the stresses to which it is subjected during use.

Due to this significant advantage, the above-described method is able to allow, in particular, the framing of a motor-vehicle body-in-white by applying a lower number of electrical resistance welding spots compared to those normally used in conventional methods.

The invention also enables the use of thinner sheets, thanks to the reinforcement obtained by depositing a multilevel cladding. Using thinner sheets results in a reduction in weight, and a reduction in process costs, since forming the sheet metal is achievable with lower cycle times and lower process energy.

According to another aspect of the invention, the invention relates to a plant for producing motor-vehicle structures or sub-assemblies thereof, wherein said structures are assembled by providing one or more joints between components using the above-defined method, characterized in that it comprises a conveying device for advancing the structures to be assembled up to a framing station, which includes robots that carry out a plurality of electrical resistance welding spots, and one or more robots that perform the aforesaid step of applying a base cladding by additive manufacturing above the electrical resistance welding spots, said plant also comprising at least one completion station, downstream of the framing station, which includes robots for the execution of said additional step of applying a fine cladding above the base cladding applied in the framing station. Still in this step, local reinforcements (multilevel cladding) can be produced on planar or aspherical surfaces (curved surfaces with an undefined profile) and also on components far from the junction areas. In this way, it is possible to use and to form thinner sheets with lower energy costs and lower cycle times, with a thickness reduced even by 50% compared to conventional solutions. The multilevel cladding, in this case, must also be designed to counteract the deformations resulting from thinning of the sheet itself.

According to another aspect, the invention also relates to a method for applying a reinforcement of metal material to a component of metal material, particularly in the construction of a motor-vehicle body or a sub-assembly thereof. According to this aspect, the method of the invention comprises the step of applying a reinforcement of metal material above the metal component, by means of an additive manufacturing technology, and is further characterized in that the aforesaid step of applying a reinforcement by additive manufacturing technology comprises a first step for applying a coarse base cladding and a second step for applying a fine cladding, including a distribution of stiffening micro-ribs, of the type that has already been described above.

Even in this case, the method according to the invention preferably also provides an additional step for the local application of a zinc overlay and/or an additional local quenching step by applying a cold fluid above the aforesaid cladding immediately after the cladding application step.

According to another embodiment of this method, the aforesaid reinforcement is applied, by using an additive manufacturing technology, on said component before subjecting the component to a forming step in a mold.

All the aforesaid characteristics of the method according to the invention open the way to a series of major improvements in the production of motor-vehicle structures compared to the techniques currently used.

DETAILED DESCRIPTION OF THE INVENTION

Figure 2:
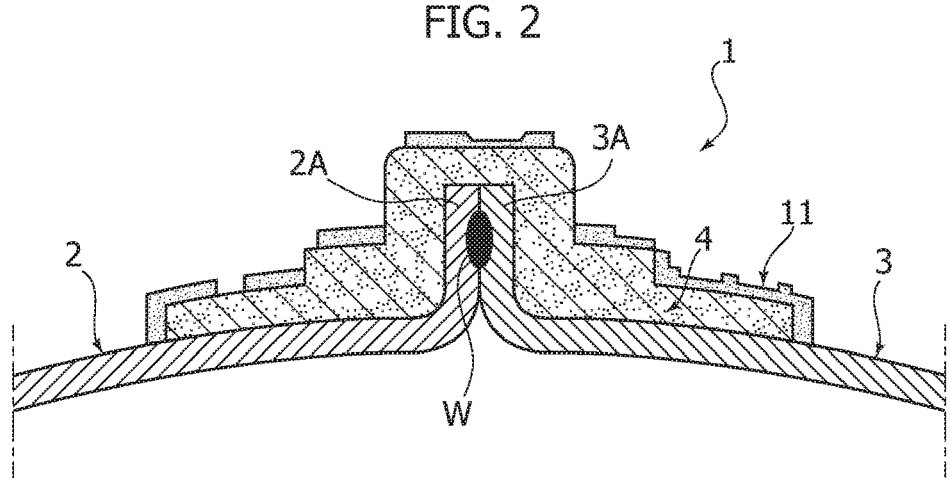
Figure 3:
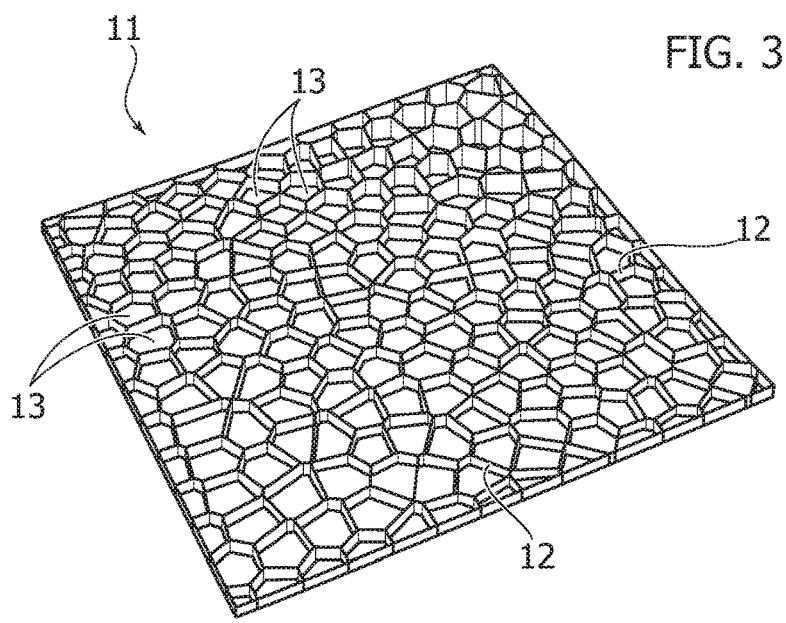
Figure 4:
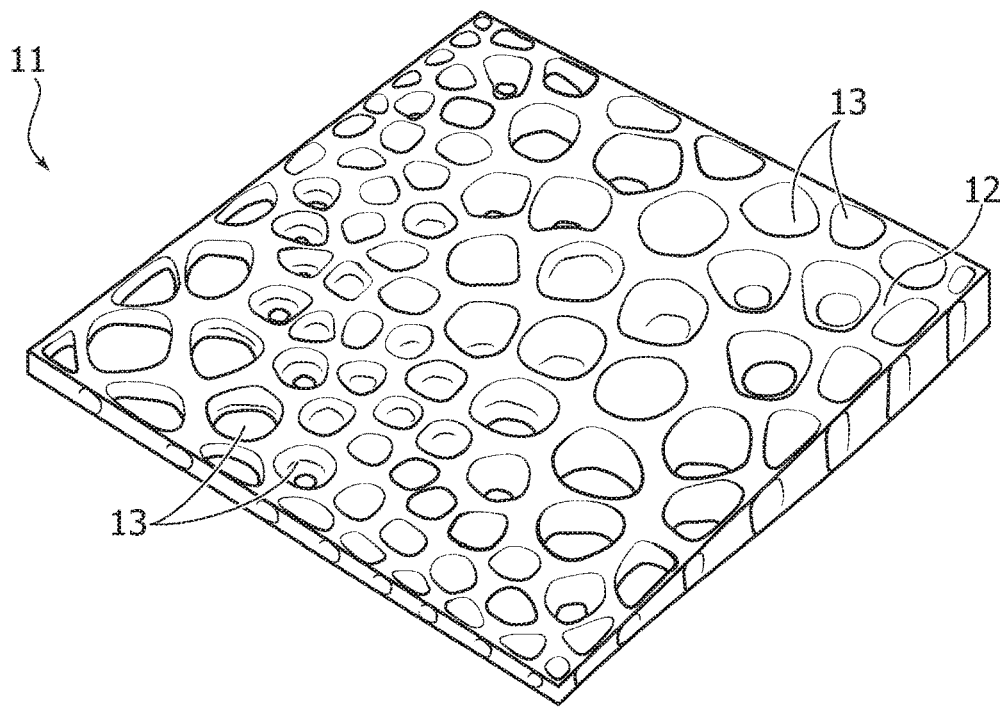
Figure 5:
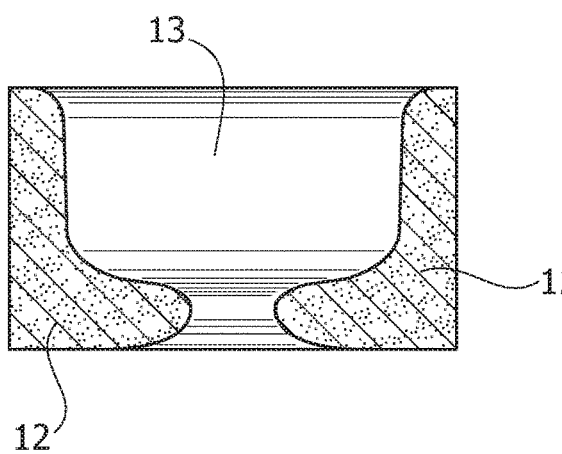
Figure 6:
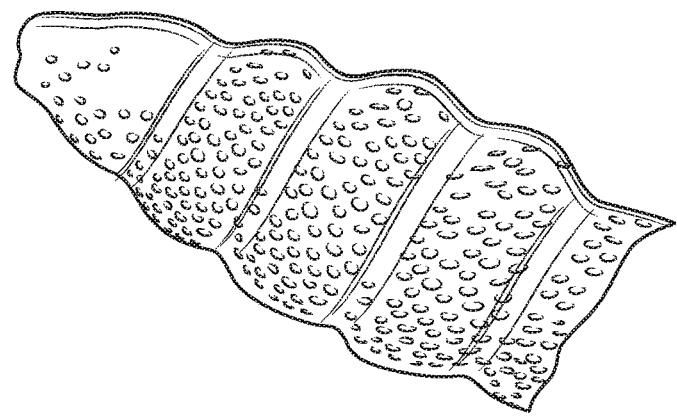
Figure 7:
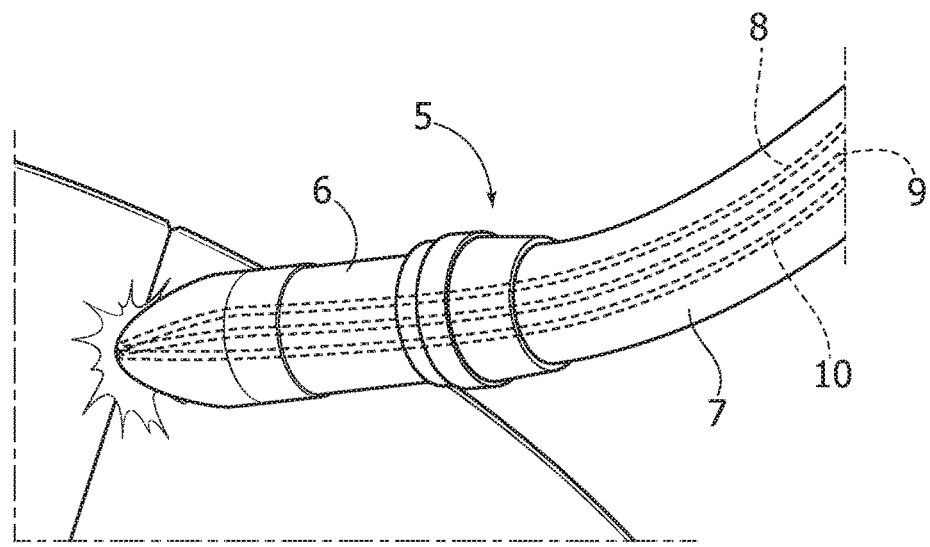
Figure 8:
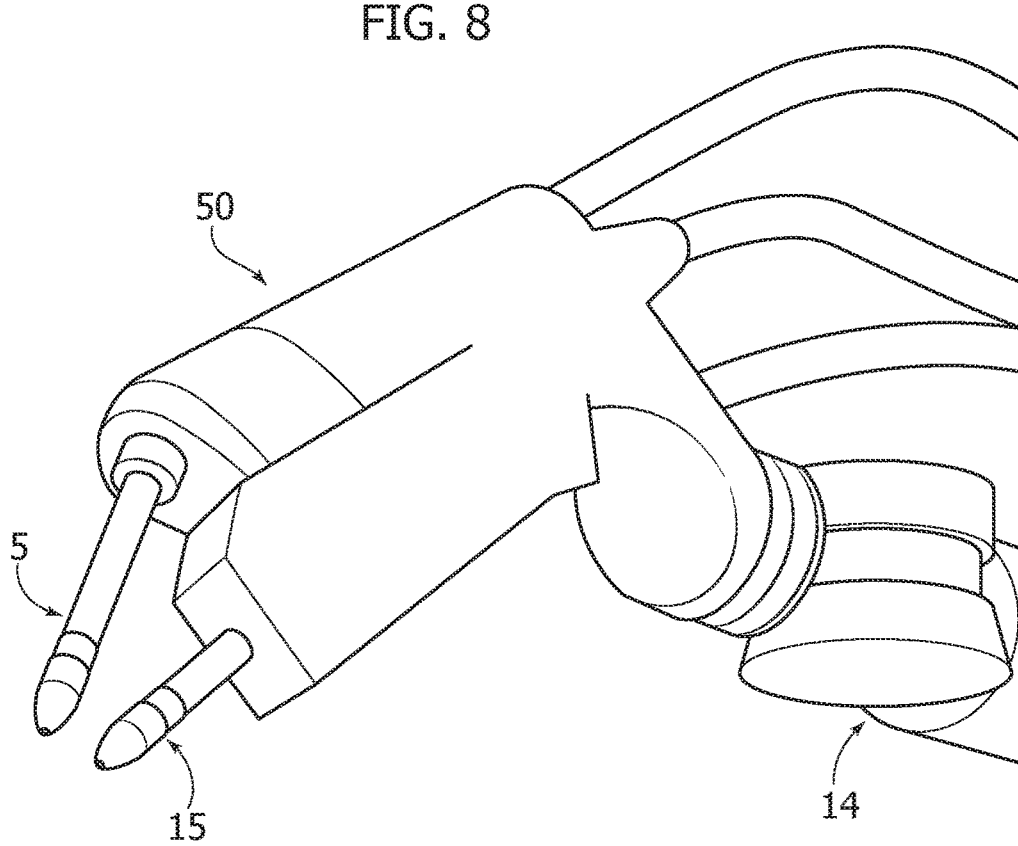
Figure 9:
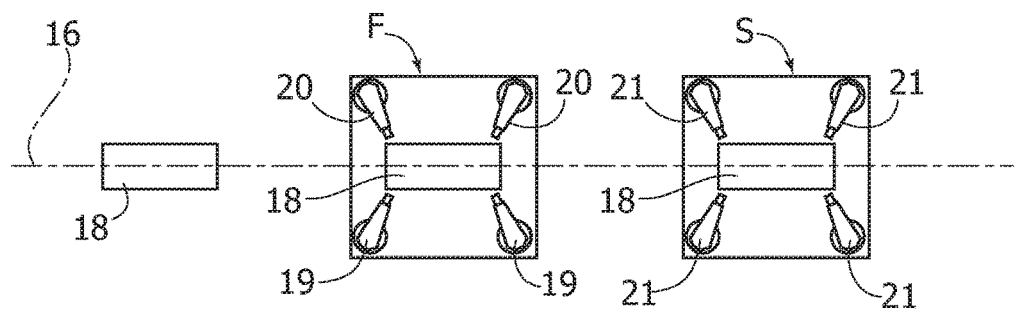
Figure 10:
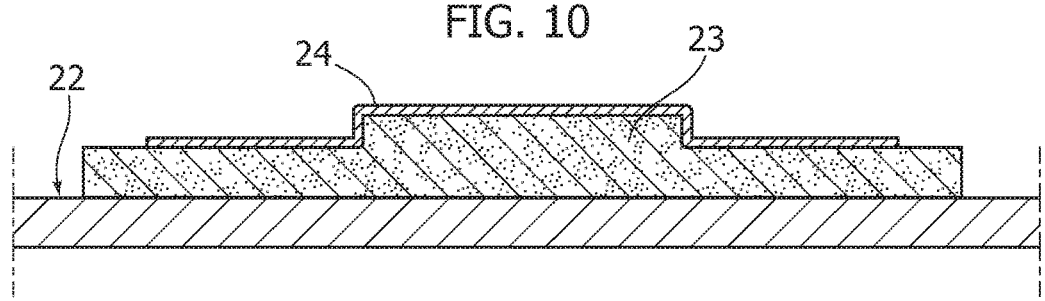
Figure 11:
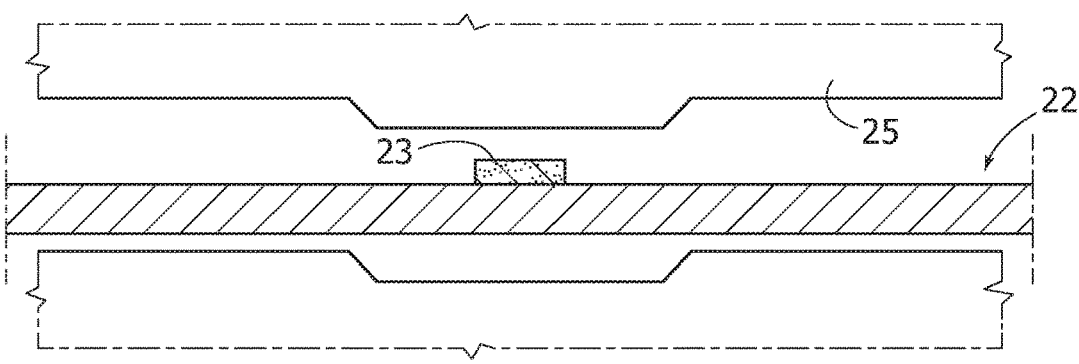
Figure 12:
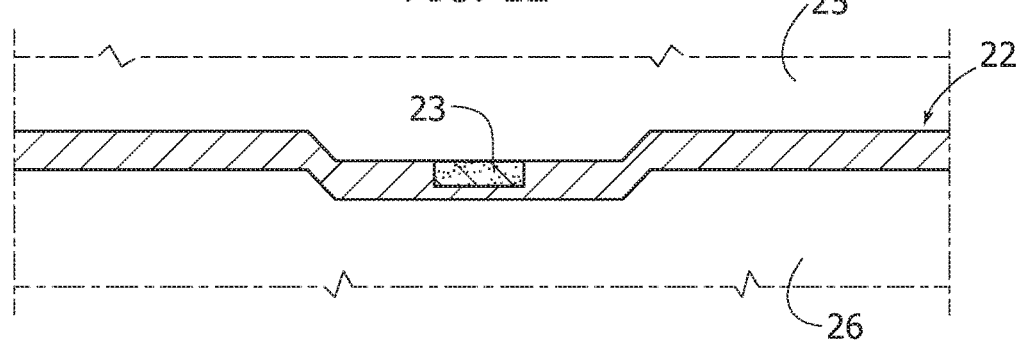

Further characteristics and advantages of the invention will become apparent from the description that follows with reference to the attached drawings, provided purely by way of non-limiting example, wherein:

FIG. 1 is a schematic cross-sectional view of a welded joint of two metal sheet elements, after a first step of an embodiment of the method according to the invention, FIG. 2 is a schematic cross-sectional view of the same welded joint of FIG. 1, after a second step of the method according to the invention, FIG. 3 is a partial perspective view of a superstructure made in the method according to the invention by additive manufacturing technology, FIG. 4 illustrates a variant of FIG. 3, FIG. 5 shows a cross-sectional view of a single cell forming part of the structure of FIG. 4, FIG. 6 is a perspective view of a seashell, FIGS. 7 and 8 are perspective views of tools usable in the method according to the invention, FIG. 9 is a schematic plan view of the layout of a production line for motor-vehicles, which makes use of the method according to the invention, FIG. 10 is a schematic cross-sectional view of a reinforcement applied above a metal sheet component by means of the method according to the invention, FIGS. 11, 12 show two steps of the method of forming a metal sheet component provided with a reinforcement obtained using the method according to the invention, and FIGS. 13-16 show another embodiment example of the method according to the invention.

In FIG. 1, the reference number 1 indicates—in its entirety—a structural joint of two steel sheet components after a first step of the method according to a first embodiment of the invention. Two steel sheet components 2, 3 have respective flanges 2A, 3A rigidly connected to each other by an electrical resistance welding spot W obtained by using a conventional electrical resistance welding head (not illustrated), including two electrodes that are pressed from opposite sides against the two flanges 2A, 3A so as to exert a pressure and simultaneously create a flow of electric current through these flanges to produce local fusion of the metal in their contact zone.

According to a first aspect of the invention, above the welded joint of the two flanges 2A, 3A, a coarse base 4 cladding is applied by additive manufacturing technology.

FIG. 7 of the attached drawings shows, by way of example, a device 5 for additive manufacturing, comprising a head 6 arranged at the end of a flexible tube 7 of elastomeric material, inside which a duct 8 for the addition of metal powders, an optical guide 9 for transmitting a laser beam and a duct 10 for feeding zinc powder are arranged.

According to a technique known per se, the device 5 feeds metal powders through the duct 8, which are immediately melted above the sheet metal components 2, 3 by means of the laser beam transmitted by the optical guide 9, so as to form, layer by layer, the coarse cladding base 4 having the required configuration.

In another embodiment, the powder can be replaced by wire. In this case, one or more coils of metal wire (or of polymeric material in the multi-material version) are provided, of various diameters (from 1 millimeter to 10 microns) and different chemical composition, for the possible production of cladding at multiple finishing levels (from 1 to n levels).

According to this embodiment of the method of the invention, once the base cladding 4 is applied, the device 5 is used to apply a further overlay of fine cladding 11, including a distribution of stiffening micro-ribs above the base cladding 4.

FIG. 3 shows a first example of a fine cladding structure having a plurality of micro-ribs 12 defining a general irregular honeycomb pattern, including a plurality of cells 13. In the example of FIG. 3, the pattern has a twodimensional configuration, in the sense that the micro-ribs 12 have a cross-section with a uniform shape and dimensions along their height.

FIG. 4 illustrates a variant of FIG. 3, in which the walls 12 have a cross-section with variable shape and dimensions along the height, according to the example illustrated, on an enlarged scale, in FIG. 5.

The Applicant has drawn inspiration for the design of the fine overlay 11 from the existence in nature of shell structures of the type illustrated in FIG. 6, which are characterized by an ideal combination of structural strength and lightness.

Thanks to the characteristics described above, the welded joint W completed at least with the coarse base cladding 4, and preferably with the fine cladding 11 as well, becomes a "structural" junction that is able to constitute a part that provides a significant contribution to the structural strength of the entire assembly.

A possible disadvantage of the method described above, which has been identified by the Applicant, is that the heat applied during the additive manufacturing step to the metal sheet structure can locally destroy an outer layer of zinc of which the sheet metal components 2, 3 can be provided with, and may furthermore jeopardize the advantages of structural strength of the sheets 2, 3 obtained by means of a quenching method to which said components have been previously subjected.

To overcome these drawbacks, the device 5 can include the duct 10 that has been mentioned above, for the addition of zinc powders, which are also applied with the additive manufacturing technique above the components, in order to restore the zinc coating above the joint coated with the layers 4 and/or 11. Furthermore, it is also possible to provide a device 5 of the type illustrated in FIG. 8 mounted, for example, on the wrist of a manipulator robot 14 (only partially visible in FIG. 8) and, in addition to the head 6 that has been described with reference to FIG. 7, it is also provided with a nozzle 15 for the addition of a cold fluid (for example nitrogen or argon) over the components 2, 3 in order to cause abrupt cooling of the components after the heating generated in the additive manufacturing step, so as to obtain local quenching of the metal components.

The method according to the invention allows the manufacturing of motor-vehicle structures, in particular the framing of motor-vehicle "bodies-in-white" with a lower number of electrical resistance welding spots, compared to conventional methods.

For example, with reference to FIG. 9, a motor-vehicle production plant can provide a line 16 on which the structures to be assembled proceed, for example conveyed on vehicles of the automated-guided type 18. Along the line 16, the vehicles 18 encounter a framing station F comprising locking devices of any known type (not illustrated) for locking the parts constituting the structures to be welded in a precise assembly position, and one or more welding robots 19 equipped with electrical resistance welding heads to perform a plurality of electrical welding spots on the structure carried by the vehicle 18. The framing station F may also comprise a plurality of robots 20 carrying devices 5 of the type described above with reference to FIG. 7, in order to apply, over the welded joints, a coarse layer of cladding, by means of additive manufacturing technology, according to the expedients that have been described above.

After leaving the framing station F, the welded structure transfers to a completion station S, in which additional robots 21 execute the application of the additional layer of fine cladding, again by means of additive manufacturing technology. These robots can also perform the restoration step of an outer zinc layer above the welded joint and carry out local quenching, according to the method described above, in order to restore the resistance characteristics of the sheet metal structures.

FIG. 10 shows a cross-section of a steel sheet component 22 on which a layer of coarse base cladding 23 and an overlap of fine cladding 24 have been applied, both with additive manufacturing technology, similar to that been described above with reference to the welded joint of FIGS. 1, 2.

If the metal sheet component 22 is a shaped component, it can be envisaged that the layers of cladding 23, 24 are applied after forming the sheet metal element, but a particularly interesting embodiment of the invention is where formation of the sheet metal component in a mold is carried out after applying the reinforcing element constituted by the base layer 23 and by the overlap 24, which preferably has a configuration of the type that has been described above with reference to FIG. 3 or to FIG. 4.

A variant of this embodiment is illustrated in FIGS. 11 and 12. These Figures show formation of a sheet metal component 22 in a mold having an upper mold 25 and a lower mold 26. In the case illustrated in FIGS. 11 and 12, before formation in the mold, a reinforcing element 23 is applied above the sheet metal 22 by means of additive manufacturing technology. Subsequently to the application of the reinforcement 23, the structure thus obtained is formed in the mold, by closing the two half-molds 25, 26 in such a way that the reinforcement 23 is incorporated into the thickness of the sheet 22.

FIGS. 13-16 show the subsequent steps of a further embodiment of the method according to the invention which produces multi-level and multi-material cladding.

Figure 13:
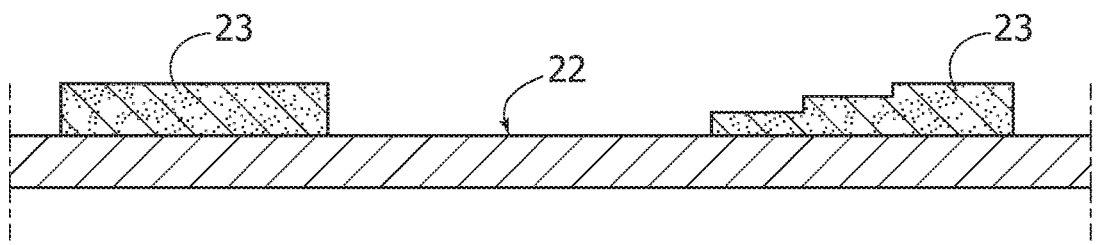
Figure 14:
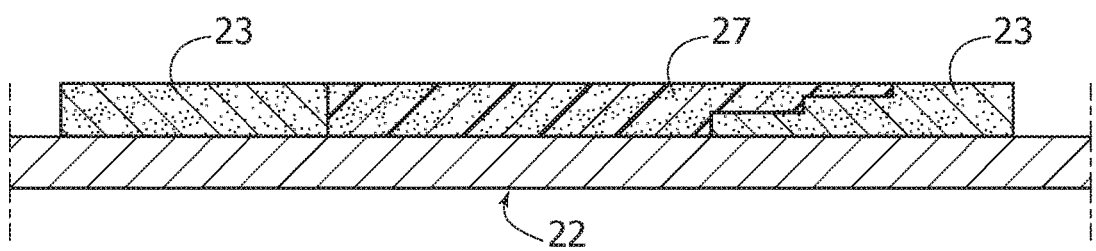
Figure 15:
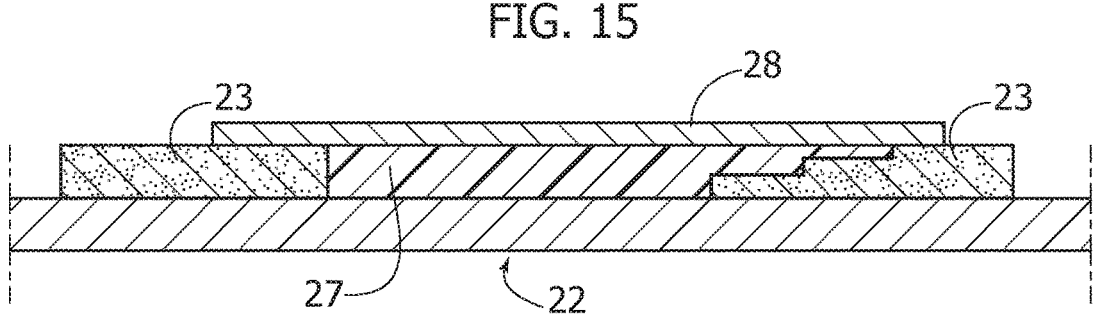
Figure 16:
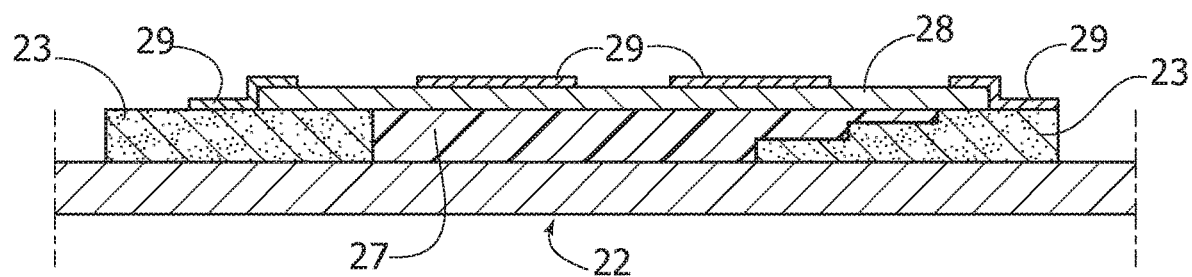

FIG. 13 shows a first step of applying a first coarse metal cladding over the component 22, defining reinforcing metal portions 23 spaced apart from each other. FIG. 14 shows a second step of application between the reinforcing metal portions 23 of a support layer 27, of a lighter material, chosen for example from plastics, light metal alloys and ceramic materials. FIG. 15 shows a subsequent step of applying another level of fine cladding 28, and FIG. 16 shows the application of a superfine final cladding, to create layers 29 above the support layer 28.

As is evident from the above, the method according to the invention provides—in its preferred embodiment—a multi-level cladding, in which each level is created with successive layers, by means of additive manufacturing. The levels may all be of metal material or may be made of different materials and also comprise levels of synthetic material or ceramic material. Preferably, in addition, the various levels have a progressively smaller dimension in height, starting from the base level, which can be a coarse cladding, with a height in the order of millimeters (that is, between 0.1 mm and 10 mm), towards the progressively finer upper levels, which may have a thickness in the micron range (between 1 micron and 200 microns) and then in the order of 10ths of microns (between 0.1 micron and 1 micron) or even less.

As is clear from the above description, the method according to the invention opens the way to a series of improvements in the production process of motor-vehicles, above all, in terms of an ideal combination of strength and lightness of the obtained structure. Moreover, as is evident from what has been described, the method according to the invention is easily applicable and adaptable to the production plants currently in use, without high costs.

Of course, without prejudice to the principle of the invention, the embodiments and the details of construction may vary widely with respect to those described and illustrated purely by way of example, without departing from the scope of the present invention.

What is claimed is:

1. A method for making a structural joint between two components of metal material, said method comprising:
   carrying out an electrical resistance welding spot between said two components, and
   applying a cladding of metal material above said electrical resistance welding spot, by utilizing additive manufacturing technology;
   wherein said applying the cladding of metal material by utilizing additive manufacturing technology comprises a first step of applying a coarse base cladding and a second step of applying a fine cladding; and
   wherein the second step of applying the fine cladding includes a distribution of stiffening micro-ribs above the base cladding.

2. The method according to claim 1, wherein said micro-ribs define an irregular honeycomb pattern with a plurality of cells whose walls have a cross-section of uniform or variable shape and size along a height of said micro-ribs.

3. The method according to claim 1, further comprising a final step of local application of a zinc overlay.

4. The method according to claim 1, further comprising a local quenching step, obtained by feeding a cold fluid above the cladding, immediately after application of the cladding.

5. The method according to claim 1, wherein said joint is created between two metal sheet components, before subjecting a structure formed by said two sheet metal components to a forming step in a mold.

6. A structure comprising at least two components, joined together by the method according to claim 1.

* * * * *